United States Patent

Mignani

[11] Patent Number: 5,945,006
[45] Date of Patent: Aug. 31, 1999

[54] METHOD AND APPARATUS FOR CLEANING FILTERS CONTAMINATED BY POLYMERS AND HOT-MELTING RESINS, IN SITU, WITHOUT REMOVING THE FILTERING ELEMENTS

[75] Inventor: Mario Mignani, Casnigo, Italy

[73] Assignee: Movengineering S.r.l., Parre, Italy

[21] Appl. No.: 08/799,740

[22] Filed: Feb. 12, 1997

[30] Foreign Application Priority Data

Feb. 29, 1996 [IT] Italy .............................. MI96A0392 U

[51] Int. Cl.⁶ .............................. B01D 29/62; B01D 33/44
[52] U.S. Cl. ........................ 210/797; 210/798; 210/409; 210/411; 210/177; 210/184; 210/333.01
[58] Field of Search ..................................... 210/791, 797, 210/798, 409, 410, 411, 412, 177, 184, 333.01; 425/197, 198, 199

[56] References Cited

U.S. PATENT DOCUMENTS 4,238,428  12/1980  Susumu et al. .
4,963,271  10/1990  Wilfried et al. .
5,200,077  4/1993  Mc Neice et al. .................... 210/323.2
5,211,845  5/1993  Noritsugu .
5,487,836  1/1996  Mason et al. ............................ 210/791
5,516,426  5/1996  Hull et al. ................................ 210/256

FOREIGN PATENT DOCUMENTS 0 369 351  5/1990  European Pat. Off. .

*Primary Examiner*—Robert J. Popovics
*Attorney, Agent, or Firm*—Guido Modiano; Albert Josif

[57] ABSTRACT

A method and an apparatus for cleaning filters contaminated by hot-melting resins and polymers in situ, without removing the filtering elements. The method comprises a preliminary step, during which the circulation of the product to be filtered through the filter to be cleaned is interrupted, and a draining step, during which a pressurized draining fluid is passed through the filter in order to empty the filter of the residual product. A filter cleaning step is then performed during which a cleaning fluid, constituted at least partially by superheated steam, is passed through the filter. The fluids used to clean the filter are then subjected to treatments to eliminate pollutants.

32 Claims, 4 Drawing Sheets

METHOD AND APPARATUS FOR CLEANING FILTERS CONTAMINATED BY POLYMERS AND HOT-MELTING RESINS, IN SITU, WITHOUT REMOVING THE FILTERING ELEMENTS

BACKGROUND OF THE INVENTION

The present invention relates to a method and an apparatus for cleaning filters contaminated by polymers and hot-melting resins in situ, without removing the filtering elements.

It is known that facilities for producing polymers and hot-melting resins, as well as facilities for processing and converting said products in the molten state, are often provided with filtration devices that have the purpose of removing from the product any impurities, gels, macromolecules, or various molecular aggregates that reduce the purity and quality of the polymer and/or of the resin.

The filtering elements of the filtration devices through which the flow of polymer or resin passes are usually contained in metal bodies that are adapted to be heated and to withstand significant pressures; it should be noted that the filtering elements and the corresponding containment bodies are usually rather expensive parts and it is therefore economically convenient to clean them in order to be able to reuse them.

The cleaning operations to which the filtering elements of currently commercially available filtration devices are subjected can consist in replacing the filtering element by means of an operation entailing partial disassembly of the containment body inside which the filtering element is placed.

This cleaning method can be performed almost exclusively on filters having a small surface, or on filters for coarse filtrations, and in facilities that process polymers and/or products in general that are not damaged if they are exposed to air.

Another cleaning method consists in fully replacing the filtering element and the containment body.

This method entails operations that are difficult and dangerous to perform, since it is necessary to work with bodies that are at a high temperature, generally around 200–300° C. and are dirty and clogged with product, which tends to escape and drip from the filtering element.

These difficulties are particularly significant with filters having large surfaces, since they are bulky and very heavy, weighing even a few tons. Moreover, from a purely technological point of view, this operation has the drawback of causing the circulation of the polymer, contained in the passages of the mechanical parts that connect the filter to the facility, which has suffered a degradation that increases in proportion to the time that elapses between the interruption and the resumption of the flow of product inside the filter.

This operation also usually requires the availability of clean filters ready to perform replacement, with a significant increase in investment costs.

After removal, the filters must be subjected to a cleaning process in expensive, specifically provided facilities, where the residues of polymers and/or resins that contaminate the containment body and the filtering elements are removed.

Another method consists in cleaning the filtering element and the containment body in situ. This method requires the possibility of interrupting the flow of the product through the filter being cleaned for all the time required to complete the cleaning cycle. Therefore, cleaning in situ very often entails using filters having a double filtering body, which are connected to the product inlet and outlet ducts through valves allowing to divert the flow of product to be filtered into one filter while the other filter is cleaned or vice versa.

Processes for cleaning in situ, i.e., without removing the filtering elements or the filtering body, are currently rarely used in the field of polymers and hot-melting resins, since they can be performed only by circulating through the filtering bodies large amounts of specific solvents that are capable of dissolving the specific type of polymer or the type of resin being processed. This method has the drawback that it has high costs for purchasing the solvent and then for treating it or disposing of it. The presence of solvent in the processing department also causes environmental pollution problems.

The use of solvents, besides not achieving a fully satisfactory degree of cleaning because of the aggressive action of the solvent on the gels and on the macromolecules is weak, also entails the risk of solvents catching fire, thus require special safety measures in the execution of the facility.

These problems have so far limited the diffusion of the cleaning-in-situ method, despite the undisputed advantages that it entails, such as for example the elimination of mechanical interventions for disassembly and cleaning on hot and dirty filters, the elimination of separate facilities for cleaning the dirty filters, and the removal not only of the polymer contained in the filter but also of the polymer contained in the passages of the mechanical parts that connect the valves and the filter body.

SUMMARY OF THE INVENTION

The aim of the present invention is to solve the above problems by providing a method and an apparatus that allow to clean in situ filters contaminated by hot-melting resins and polymers thoroughly, accurately, safely, and with low plant and running costs.

Within the scope of this aim, an object of the invention is to provide a method that allows a high degree of cleaning of the filtering elements and of the containment body of said filtering elements, removing all the organic material present in the space affected by the interruption of the flow of product during the cleaning of the filter.

Another object of the invention is to provide a method that is capable of ensuring excellent cleaning of the filter without damaging the filtering elements.

Another object of the invention is to provide a method that produces limited amounts of pollutants and does not produce special solid or liquid waste that is difficult to dispose of.

Another object of the invention is to provide a method that also allows to eliminate any polluting noncondensable substances produced by the degradation of the polymers and of the resins.

Another object of the invention is to provide an apparatus for performing the method that can be installed very simply in the facilities for producing and processing hot-melting resins and polymers that are currently in use.

This aim, these objects, and others that will become apparent hereinafter are achieved by a method for cleaning filters contaminated by hot-melting resins and polymers in situ, without removing the filtering elements, characterized in that it comprises: a preliminary step, during which the circulation of the product to be filtered through the filter to be cleaned is interrupted; a draining step, during which a pressurized draining fluid is passed through said filter in order to empty the filter of the residual product; a filter cleaning step, during which a cleaning fluid, constituted at least partially by superheated steam, is passed through said filter.

The apparatus for performing the method according to the invention is characterized in that it comprises: valve means for closing the intake duct for the product to be filtered and the discharge duct for the product filtered in said filter; means for circulating, through said filter, a draining fluid for emptying said filter of the residual product; means for circulating, through said filter, a cleaning fluid that is at least partially constituted by superheated steam; and means for collecting said fluids when they exit from said filter.

BRIEF DESCRIPTION OF THE DRAWINGS

Further characteristics and advantages of the invention will become apparent from the description of a preferred but not exclusive embodiment of the method according to the invention and of the apparatus for performing it, which are illustrated only by way of non-limitative example in the accompanying drawings, wherein.

DESCRIPTION OF THE PREFERRED EMBODIMENTS

With reference to the above figures, the apparatus for performing the method according to the invention comprises: valve means for closing the intake duct 1 for the product to be filtered and of the discharge duct 2 for the product that has been filtered in the filter to be cleaned; means for circulating through said filter a draining fluid to empty the filter of the residual product; means for circulating through the filter a cleaning fluid that is at least partially constituted by superheated steam; and means for collecting the fluids that exit from the cleaned filter.

Figure 1:
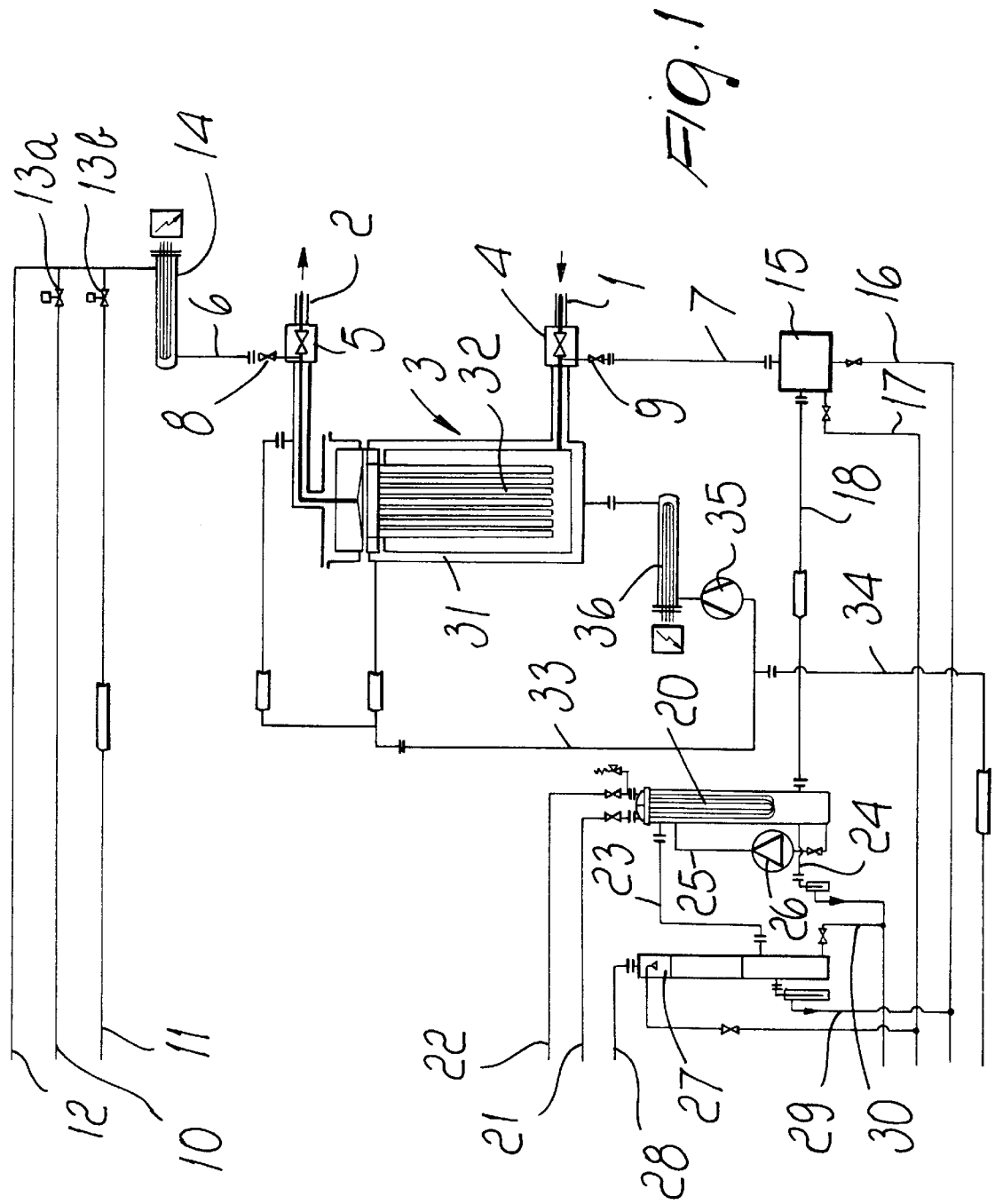
FIG. 1 is a view of a first embodiment of the apparatus for performing the method according to the invention, applied to a facility for producing or processing polymers with a single filter.

More particularly, in the embodiment shown in FIG. 1, intended for application to a facility provided with a single filter 3, the valve means for closing the intake duct 1 and the discharge duct 2 can be simply constituted by closure valves 4 and 5 that can be actuated on command.

In this embodiment, the means for circulating the draining fluid and the cleaning fluid through the filter 3 comprise a feed duct 6, which is connected, proximate to the valve 5, to the portion of the duct 2 that runs between the valve 5 and the filter 3, and an extraction duct 7, which is connected, proximate to the valve 4, to the intake duct 1 between the valve 4 and the filter 3. Respective valves 8 and 9 are arranged on the feed duct 6 and on the extraction duct 7 and allow to regulate the flow inside the ducts 6 and 7.

The duct 6 is connected to a compressed nitrogen feed duct 12, to a compressed air feed duct 10, and to a pressurized superheated steam feed duct 11. Respective valves 13a and 13b are arranged along the feed ducts 10 and 11 and can be actuated so as to regulate the stream of air and superheated steam entering the feed duct 6.

Heating means can be provided along the feed duct 6 and can be constituted for example by an electric resistor 14 for superheating the nitrogen, the air, and the steam before introducing them in the filter 3.

The means for collecting the fluids that leave the filter 3 while it is being cleaned comprise a container 15 connected to the extraction duct 7 and in which the residual product drained from the filter 3 is collected, as will become apparent hereinafter. The container 15 is connected to an intake duct 17 and to a discharge duct 16 for circulating water on the bottom of the container 15 to cool the residual product drained from the filter 3. The container 15 is also connected to a duct 18, through which the vapors accumulating in the container 15 are removed.

The duct 18 is connected to means for eliminating the pollutants contained in the vapors; said means essentially comprise a condenser 20 that is constituted by a heat exchanger and is connected to an intake duct 21 and a discharge duct 22 for the cooling fluid, and to a discharge duct 23 for the noncondensable content, or fumes, and to a discharge duct 24 for the condensate. The condenser 20 is also provided with a recirculation circuit 25 on which a pump 26 is arranged.

The duct 24 conveys the condensate to a biological treatment facility, whereas the duct 23 leads into a scrubber 27, where the noncondensable part, i.e., the fumes, is scrubbed with water or treated with an activated-charcoal filter.

The scrubber 27 is connected to a discharge duct 28, through which the fumes, after washing, are released into the atmosphere. The scrubber 27 is also provided with a discharge duct 29 for the reusable water and with a discharge duct 30 for the water to be conveyed to the biological treatment facility.

Advantageously, means for heating the filter 3 are also provided.

Said heating means can be constituted by means for circulating a stream of superheated air inside an interspace 31 formed in the casing of the filter 3 that contains the filtering element 32.

More particularly, there is a circuit 33 that is connected to the atmosphere by means of a duct 34. A pump 35 and heating means 36 are arranged along the circuit 33; said heating means are constituted, for example, by an electric resistor or by other heating means that circulate superheated air in the interspace 31. It should be noted that the circuit 33, along which the superheated air is circulated, can affect not only the casing of the filter 3 but also the intake duct 1 and the discharge duct 2.

Instead of providing an interspace in the casing of the filter 3, it is possible to provide ducts for circulating the superheated air that are connected to the outer surface of the body of the filter.

As an alternative, instead of using superheated air, it is possible to use heated diathermic oil or electric resistors connected to the outer walls of the filter body.

Figure 2:
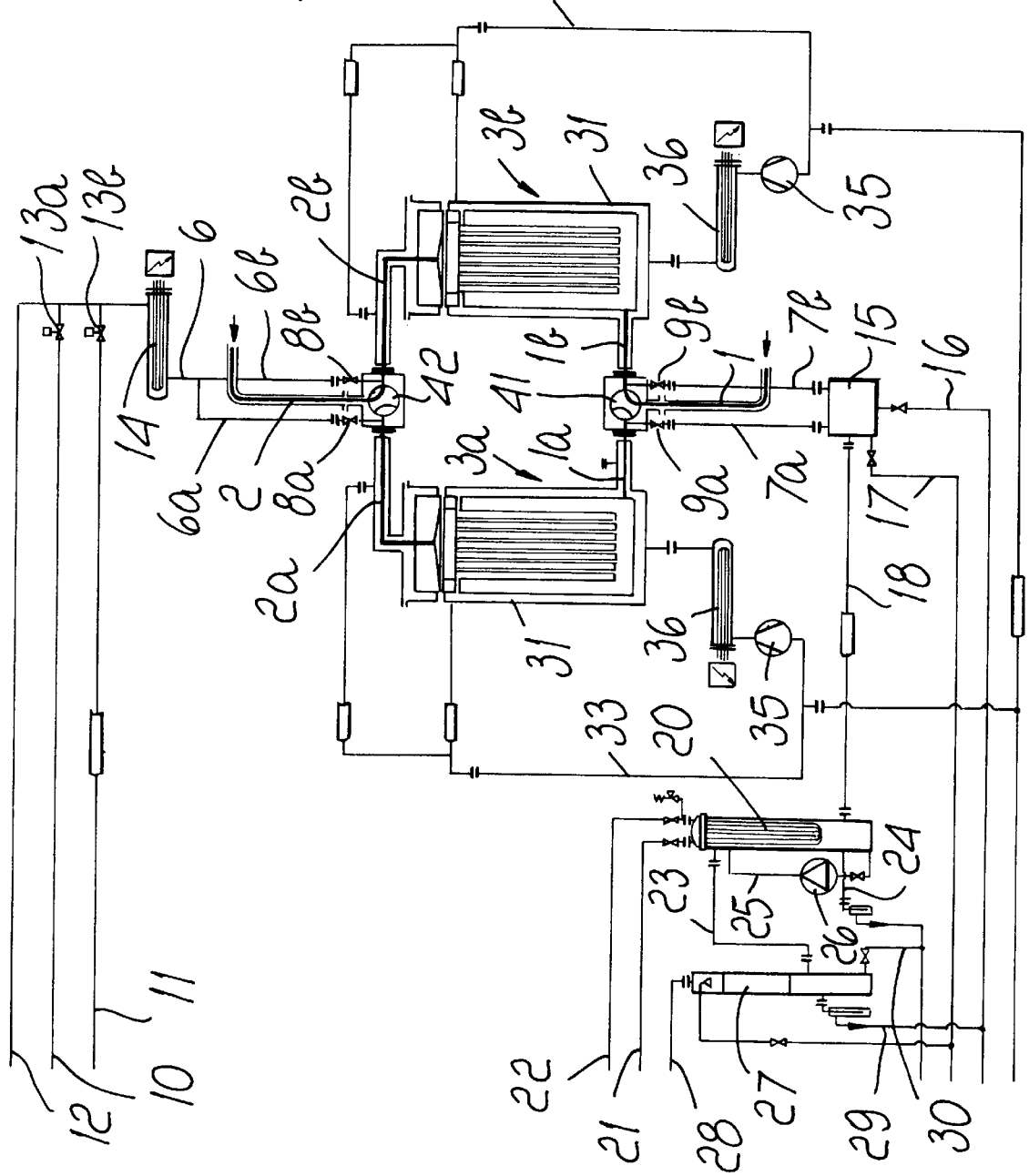
FIG. 2 is a view of a second embodiment of the apparatus for performing the method according to the invention, applied to a facility with two filters that can be used alternately and can be heated with a stream of superheated air.
Figure 3:
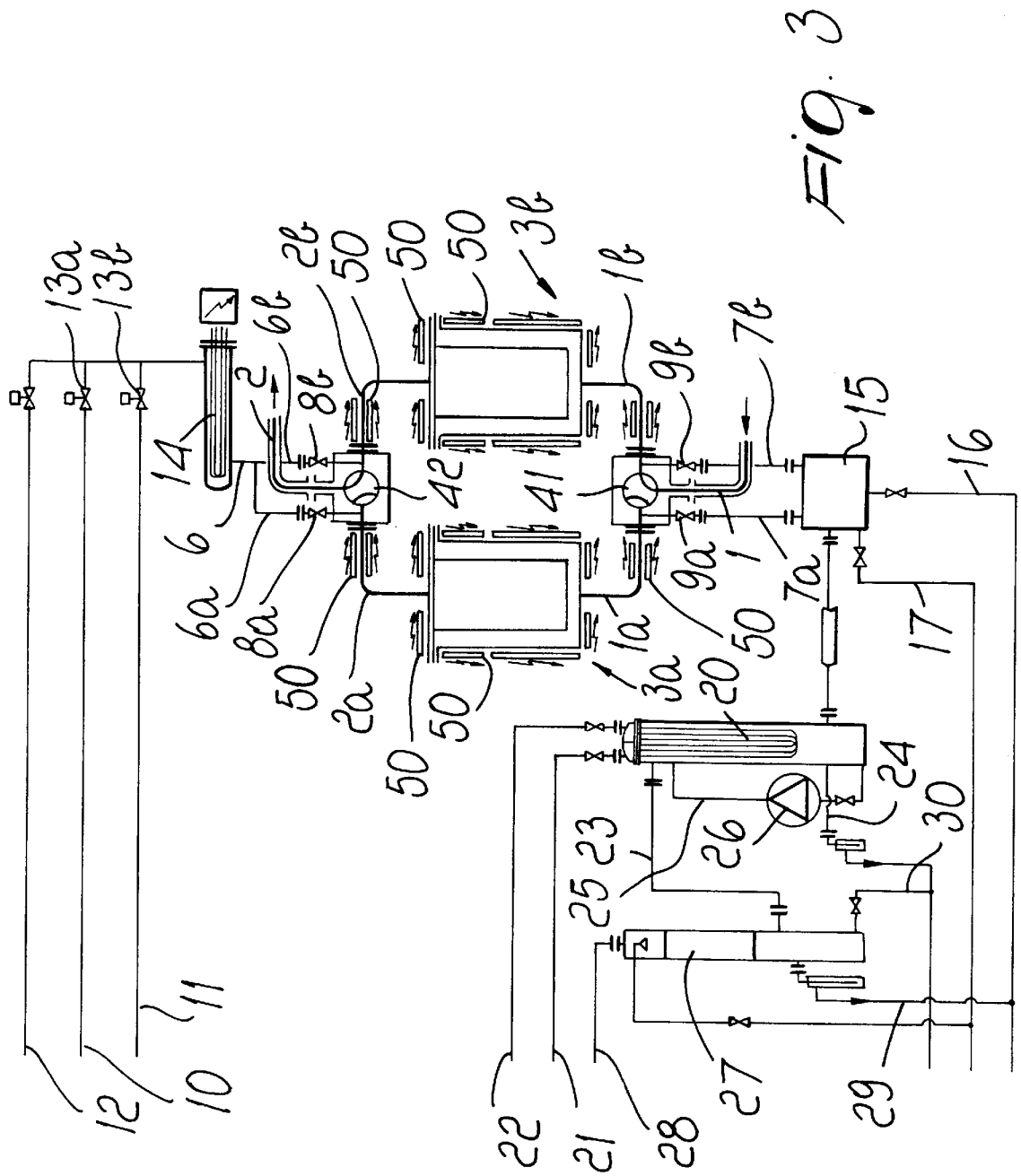
FIG. 3 is a view of another embodiment of the apparatus for performing the method according to the invention, applied to a facility with two filters that can be used alternately and can be heated by means of electric resistors.
Figure 4:
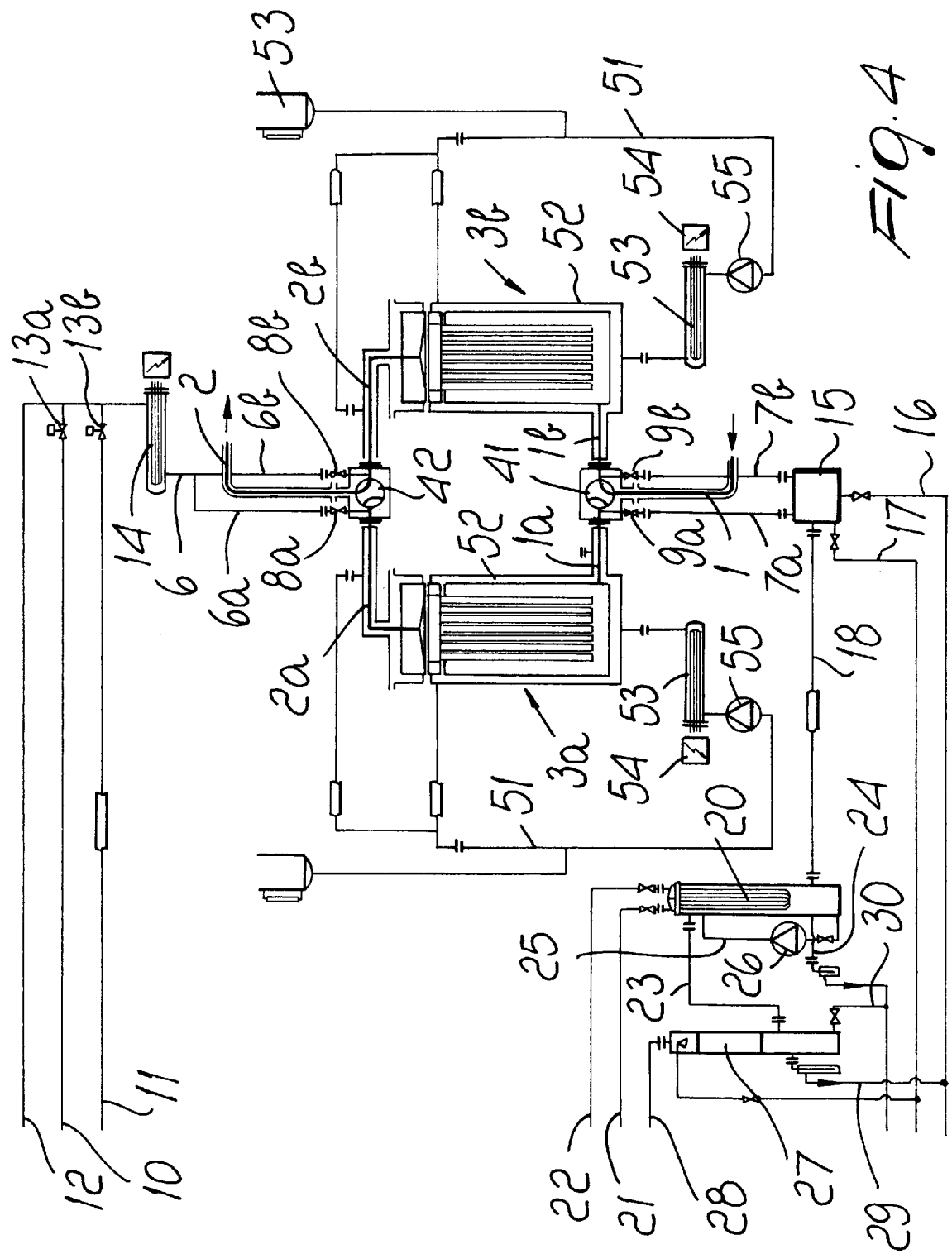
FIG. 4 is a view of another embodiment of the apparatus for performing the method according to the invention, applied to a facility provided with two filters that can be used alternately and can be heated with a stream of heated diathermic oil.

FIGS. 2 to 4 illustrate the apparatus for performing the method according to the invention, applied to a facility with two filters 3a and 3b that can be used alternately so as to avoid interrupting production during the cleaning of one of the two filters.

In this case, the intake duct 1 for the product to be filtered has two branches 1a and 1b that enter the filter 3a and the filter 3b respectively.

Similarly, the discharge duct 2 has two branches 2a and 2b that connect it to the filter 3a and to the filter 3b respectively.

In this case, the valve means for closing the intake duct 1 and the discharge duct 2 for the filter to be cleaned are constituted by shunts 41 and 42 that are arranged respectively at the branching point of the intake duct 1 and of the discharge duct 2 and can be actuated so as to connect selectively the duct 1 to the branch 1a or to the branch 1b and the duct 2 to the branch 2a or to the branch 2b, depending on which filter is to be cleaned.

In this case, the intake duct 6 has two branches 6a and 6b connected respectively to the branch 2a and to the branch 2b proximate to the shunt 42. Respective valves 8a and 8b are arranged on the branches 6a and 6b of the duct 6 to regulate the flow along said branches.

Similarly, the extraction duct corresponding to the extraction duct 7 described with reference to FIG. 1, is split into two extraction ducts 7a and 7b, with valves 9a and 9b, that enter a container 15 for collecting the residual product and the fluids introduced in the filter being cleaned through the intake duct 6.

The container 15 is connected, in a why similar to what has been described with reference to FIG. 1, to a duct 17, to a duct 16 for circulating water for cooling the residual product, and to a duct 18 for removing the vapors. The duct 18 in turn enters a condenser 20 supplied with a cooling fluid by means of an intake duct 21 and a discharge duct 22.

The condenser 20 has a fume discharge duct 23 that enters a scrubber 27 or an activated-charcoal filter and a discharge duct 24 for the condensed part, which conveys said condensed part to a biological treatment facility.

Reference is made to the description given for FIG. 1 as regards the other elements related to the condenser 20 and to the scrubber 27. The elements of FIGS. 2 to 4 that correspond to the elements that have already been described with reference to FIG. 1 have been designated by the same reference numerals.

In a way similar to what has been described with reference to the embodiment shown in FIG. 1, the intake duct 6 is connected to a duct 12 for supplying pressurized nitrogen, to a duct 10 for feeding pressurized superheated air, and to a duct 11 for feeding superheated steam. Valves 13a and 13b are provided on the ducts 10 and 11, in a way similar to what has already been described, in order to regulate the stream of superheated air and superheated steam that is conveyed along the duct 6.

A heater 14 can be provided along the same duct 6 and can be constituted for example by an electric resistor or by a heat exchanger, according to requirements.

The apparatus for performing the method according to the invention comprises means for heating the filter to be cleaned also in the embodiments shown in FIGS. 2 to 4.

As shown in FIG. 2, said filter heating means can be constituted, for each of the filters 3a and 3b, by a circuit 33 inside which superheated air is circulated, for example by means of an electric resistor 36 and a pump 35. The circuit 33 supplies an interspace 31 that is formed in the body of the filters 3a, 3b or ducts connected to the outer surface of the casing of the filters 3a, 3b.

The heating means may also affect the branches 2a, 2b, 1a, and 1b, as already mentioned with reference to FIG. 1.

It should be noted that each filter 3a, 3b has its own heating circuit.

As shown in FIG. 3, the heating means can be constituted by electric resistors 50 applied to the outer walls of the filters 3a and 3b and to the outer walls of the branches 1a, 1b, 2a, and 2b instead of being constituted by a circuit for circulating superheated air inside an interspace or inside ducts connected to the outer walls of the casing of the filters 3a, 3b.

FIG. 4 illustrates another possibility for heating the filters 3a and 3b, which substantially consists in providing, for each filter 3a and 3b, a circuit 51 that supplies an interspace 52 formed in the casing of the filters 3a and 3b, or ducts connected to the outer surface of the filter casing with diathermic oil that is fed by an appropriately provided tank 53, is heated by means of an electric resistor 54 or another heating means, and circulated along the circuit by means of a pump 55.

The operation of the apparatus in performing the method according to the invention is as follows.

When it is necessary to clean a filter 3, 3a, or 3b, the filter to be cleaned is isolated from the rest of the facility by closing the valves 4 and 5 or by switching the shunts 41 and 42.

Then the filter to be cleaned is drained, so as to make the residual product leave the filter. The filter is drained by introducing in the filter, through the duct 6, a stream of air, steam, and nitrogen, connecting the duct 6 to the ducts 10, 11, and 12.

The residual product leaves the filter being cleaned through the duct 7, 7a, or 7b, and is collected in the container 15, where it is cooled and from which it is then removed.

A step for heating the filter being cleaned is preferably performed after the draining step, so as to raise its interior to a temperature substantially between 350° C. and 480° C.

After heating the filter, a stream of superheated steam at a temperature substantially between 350° C. and 520° C., or a controlled mix of superheated steam and superheated air at a temperature substantially between 380° C. and 500° C., is sent into said filter by means of the connection of the duct 6 to the ducts 10 and 11. As a consequence the polymer or resin is quickly degraded under the combined action of thermal degradation, hydrolysis, and optionally oxidation, if air is introduced together with steam. This step, which can last for example 3 to 16 hours, continues until the organic material still present in the filter has been removed completely.

During the step for cleaning the filter with superheated steam or with a mixture of superheated steam and superheated air, the temperature inside the filter is preferably between 350° C. and 500° C., with a relative pressure that is substantially between 0 and 0.2 MPa.

The method for cleaning the filter is completed by means of an oxidation step consisting in sending a stream of air superheated at a temperature substantially between 350° C. and 500° C., preferably 450° C., into the filter through the duct 6, 6a, or 6b, so as to remove the traces of any carbon residues. This step can last, for example, 1 to 4 hours.

It should be noted that the fluids used to clean the filter and for the subsequent oxidation step are fed into the filter in a direction that is opposite to the direction followed by the product during the use of the filter, thus achieving highly effective cleaning.

The various fluids fed into the filter and the organic substances removed from it are conveyed through the duct 7, 7a, or 7b into the container 15. The vapors are removed from the container 15 through the duct 18 and are conveyed to the condenser 20.

The condensable part of the vapors 18, after condensing, is sent to a biological treatment facility through the duct 24, whereas the noncondensable part, i.e., the fumes, is removed through the duct 23 and scrubbed inside the scrubber 27 or treated by means of an activated-charcoal filter before being released into the atmosphere.

In practice it has been observed that the method according to the invention fully achieves the intended aim, since it achieves excellent cleaning of the filters with very low plant and running costs without requiring the removal of the filtering elements.

The method and the apparatus for performing it, thus conceived, are susceptible of numerous modifications and variations, all of which are within the scope of the inventive concept; all the details may also be replaced with other technically equivalent elements.

In practice, the materials employed, as well as the dimensions, may be any according to the requirements and the state of the art.

What is claimed is:

1. A method for cleaning a filter which is contained in a filter housing positioned in a hot-melting resin or polymer treatment facility and which is contaminated by a hot-melting resin and polymer product in situ, without removing the filter from the filter housing and without removing the filter housing from the hot-melting or polymer treatment facility, the method comprising the successive steps of:
    a preliminary step, during which circulation of the product to be filtered through the filter to be cleaned is interrupted;
    a draining step, during which a pressurized draining fluid is provided that is passed through said filter in order to empty the filter of residual product;
    a filter cleaning step, during which a cleaning fluid is provided, constituted at least partially by superheated steam, and is passed through said filter such that the polymer or resin on the filter is quickly degraded under the combined action of thermal degradation and hydrolysis; and
    after said cleaning step, an oxidation step during which a heated oxidizing fluid is provide which is made to flow through said filter;
    and the filter and the filter housing are positioned in fixed positions in the hot-melting resin or polymer treatment facility, and said preliminary step, said draining step, said filter cleaning step, and said oxidation step are all performed without moving the filter and the filter housing out of their respective fixed positions.

2. Method according to claim 1, wherein said draining fluid comprises air.

3. Method according to claim 1, wherein said draining fluid comprises nitrogen.

4. Method according to claim 1, wherein said draining fluid comprises steam.

5. Method according to claim 1, wherein said draining fluid is constituted by a mixture of fluids selected from the group consisting of steam, air and nitrogen.

6. Method according to claim 1, wherein said draining fluid is passed through said filter in an opposite direction with respect to a direction followed by the product during its filtration.

7. Method according to claim 1, further comprising, after said preliminary step and before said cleaning step, a step for heating said filter.

8. Method according to claim 7, wherein during said heating step the filter is heated to a temperature that is substantially between 350° C. and 480° C.

9. Method according to claim 1, wherein said cleaning fluid is fed into said filter at a temperature that is substantially between 350° C. and 520° C.

10. Method according to claim 1, wherein said cleaning fluid is entirely constituted by superheated steam.

11. Method according to claim 1, wherein said cleaning fluid is constituted by a mixture of superheated steam and superheated air such that the polymer or resin on the filter is quickly degraded under said combined action which further includes oxidation.

12. Method according to claim 11, wherein said cleaning step is performed for a time which is sufficient so that all organic material present in the filter has been removed, and wherein with said oxidation step, traces of any carbon residues are removed.

13. Method according to claim 1, wherein said cleaning fluid is made to flow through said filter in an opposite direction with respect to a direction followed by the product during its filtration.

14. Method according to claim 1, wherein said oxidizing fluid is fed into said filter at a temperature that is substantially between 350° C. and 500° C.

15. Method according to claim 1, wherein said oxidizing fluid is constituted by superheated air.

16. Method according to claim 1, wherein said oxidizing fluid is made to flow through said filter in an opposite direction with respect to a direction followed by the product during its filtration.

17. Method according to claim 1, wherein a relative pressure is provided inside said filter during said cleaning step and said oxidation step, said pressure being substantially between 0 and 0.2 MPa.

18. Method according to claim 1, wherein said draining, cleaning and oxidizing fluids are made to leave said filter and are subjected further to treatments to eliminate pollutants.

19. Method according to claim 18, wherein said treatments comprise a step for condensing vapors that are present in said fluids leaving said filter.

20. Method according to claim 18, wherein said treatments comprise a step for filtering noncondensable components of said fluids with activated-charcoal.

21. A filter cleaning apparatus in combination with a hot-melting resin or polymer treatment facility in which is positioned a filter casing part containing a filter to be cleaned of a hot-melting resin and polymer product, in situ without removing the filter from the casing part and without removing the casing part from the hot-melting or polymer treatment facility, the apparatus comprising;
    an intake duct connected to said casing part for feeding the product to be filtered through the filter contained in the casing part;
    a discharge duct connected to said casing part for discharging from said casing part the product filtered in said filter;
    closure valve means for selectively closing the intake and discharge ducts;
    means for circulating, through said filter, a draining fluid to empty said filter of residual product after said closure valve means have closed the intake and discharge ducts;
    means for circulating, through said filter, a cleaning fluid that is at least partially constituted by superheated steam after the filter has been emptied of residual product and while said closure valve means are still selectively positioned to close the intake and discharge ducts such that the polymer or resin on the filter is quickly degraded under the combined action of thermal degradation and hydrolysis;

means for circulating through said filter, a heated oxidizing fluid after the cleaning fluid has been circulated through the filter and while said closure valve means are still selectively positioned to close the intake and discharge ducts; and means for collecting said fluids when they leave said filter;

the filter and the filter casing part being positioned in fixed positions in the hot-melting resin or polymer treatment facility, and said closure valve means, said means for circulating the draining fluid, said means for circulating the cleaning fluid, and said means for circulating the oxidizing fluid are all adapted to operate without moving the filter and the filter casing part out of their fixed positions.

22. The combination of claim 21, further comprising heating means for heating said filter at the casing part thereof.

23. The combination of claim 22, wherein said heating means for heating the filter comprise electric resistors, said resistors being applied to the casing part of said filter.

24. The combination of claim 22, wherein said means for heating the filter comprise means for circulating any of a stream of superheated air and heated diathermic oil in an interspace that is formed in the casing part of said filter.

25. The combination of claim 22, comprising ducts connected to outside walls of said casing part, the stream of superheated air or heated diathermic oil being circulated in said ducts.

26. The combination of claim 21, wherein said means for circulating the cleaning fluid comprise means for circulating a stream of the cleaning fluid comprising superheated steam and superheated air such that the polymer or resin on the filter is quickly degraded under said combined action which further includes oxidation, and for a sufficient time so that all organic material present in the filter has been removed, and wherein said means for circulating the heated oxidizing fluid are adapted to remove traces of any carbon residues on said filter.

27. The combination of claim 26, further comprising valve means; a duct for supplying pressurized superheated steam; and a duct for supplying compressed superheated air, and wherein said means for circulating a draining fluid, said means for circulating a cleaning fluid, and said means for circulating a stream of superheated air comprise a feed duct that is connected to said discharge duct, and an extraction duct that is connected to said intake duct, said feed duct being connectable, through said valve means, to said duct for supplying pressurized superheated steam and to said duct for supplying compressed superheated air.

28. The combination of claim 27, comprising a duct for supplying compressed nitrogen and further valve means, said feed duct being connectable through said further valve means, to said duct for supplying compressed nitrogen.

29. The combination of claim 27, comprising processing means for processing said fluids leaving said filter, said extraction duct being connected to said means for processing the fluids leaving said filter.

30. The combination of claim 29, wherein said means for treating the fluids leaving said filter comprises a heat exchanger for cooling and condensing condensable content of the fluids leaving said filter.

31. The combination of claim 30, wherein said means for treating the fluids leaving said filter further comprises a scrubber for fumes discharged by said heat exchanger.

32. The combination of claim 30, wherein said means for treating the fluids leaving said filter further comprises an activated-charcoal filter for filtering fumes discharged by said heat exchanger.

* * * * *